United States Patent [19]
Papst et al.

[11] 3,742,267
[45] June 26, 1973

[54] FAN ARRANGEMENT HAVING AUTOMATIC CONTROL CAPABILITY

[75] Inventors: Georg F. Papst; Hans-Dieter Papst, both of Georgen, Germany

[73] Assignee: Papst-Motoren KG, Georgen, Germany

[22] Filed: Sept. 23, 1970

[21] Appl. No.: 74,604

[30] Foreign Application Priority Data
Sept. 27, 1969 Germany.................. P 19 48 906.6

[52] U.S. Cl...................... 310/67, 310/62, 310/168
[51] Int. Cl. ........................................... H02k 7/00
[58] Field of Search ................ 310/67, 62, 63, 171, 310/68, 68 E, 263, 113, 114, 257, 168, 169, 170; 318/463, 469

[56] References Cited
UNITED STATES PATENTS

| | | | |
|---|---|---|---|
| 3,596,122 | 7/1971 | Stewart................................. | 310/67 |
| 3,509,395 | 4/1970 | Schrecongost...................... | 310/168 |
| 2,467,582 | 4/1949 | Corkran.............................. | 318/463 |
| 3,504,208 | 3/1970 | Rivers................................. | 310/257 |
| 2,926,838 | 3/1960 | Van Rijn.............................. | 310/67 |
| 2,990,112 | 6/1961 | Levy.................................... | 310/67 |
| 2,206,920 | 7/1940 | Riggs........................... | 310/171 UX |
| 2,829,287 | 4/1958 | Font..................................... | 310/67 |
| 3,486,054 | 12/1969 | Livingston ......................... | 310/171 |
| 3,553,557 | 1/1971 | Korthaus............................. | 318/463 |
| 3,538,362 | 11/1970 | Cheetham.......................... | 310/171 |

FOREIGN PATENTS OR APPLICATIONS

| | | | |
|---|---|---|---|
| 975,641 | 11/1964 | Great Britain...................... | 310/168 |
| 897,190 | 3/1945 | France................................ | 310/169 |

*Primary Examiner*—R. Skudy
*Attorney*—Michael S. Striker

[57] ABSTRACT

A fan arrangement with a motor for rotating the impeller thereof. A signal generator for producing an electrical signal in accordance with the rotational speed of the impeller. The generator including a stationary claim-pole unit with a pickup member. The rotor including a multi-pole permanently magnetized ring positioned outwardly of the claw-pole unit.

4 Claims, 11 Drawing Figures

3,742,267

Patented Jun 26 1973

Inventors:
GEORG F. PAPST
HANS-DIETER PAPST
by Michael S. Striker
Attorneys

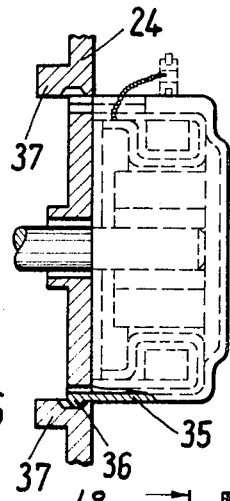
Fig. 6
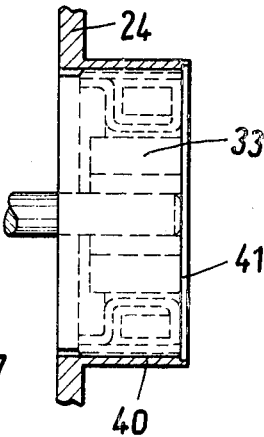
Fig. 7
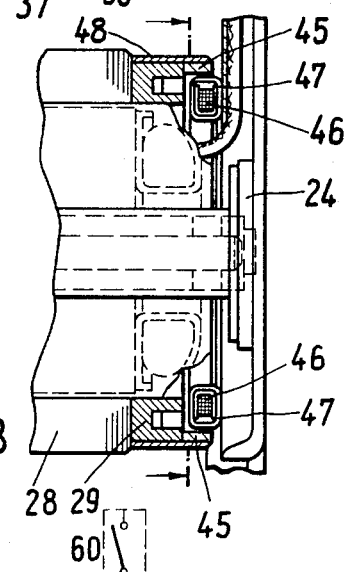
Fig. 8
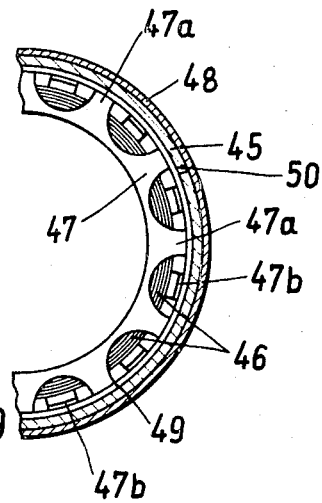
Fig. 9
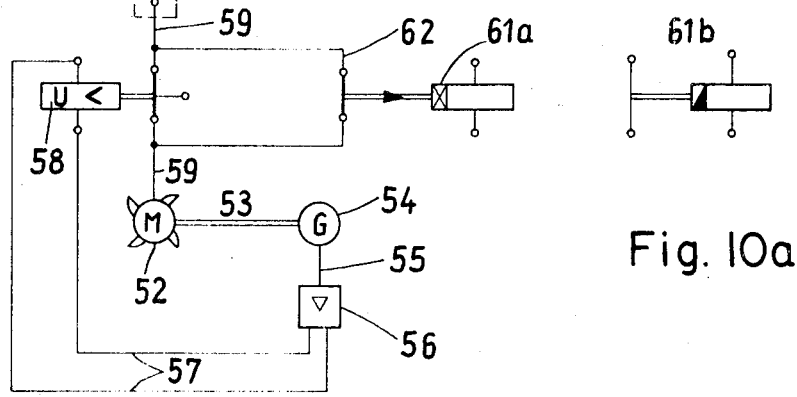
Fig. 10
Fig. 10a
Inventors:
GEORG F. PAPST
HANS-DIETER PAPST
Attorneys

FAN ARRANGEMENT HAVING AUTOMATIC CONTROL CAPABILITY

BACKGROUND OF THE INVENTION

Small fans are used for the cooling and ventilation respectively of electronic devices, computer units and so on. In special cases the reliability of the ventilation of such electronic devices can be of extraordinary importance and therefore requires supervision. There are also other applications of small electric motor driven fans where any irregularity in the number of rotations of the electric motor requires immediate attention and where a protection device in accordance with the invention can be applied.

Known thermal protection elements can be used for the above purposes in some such cases, such elements responding, when the rotor is not in motion due to overheating, at a given excess temperature, for instance 120 percent of the nominal working temperature, and which are on sale in quality tolerance classes of for instance ± 3 percent (these are very expensive); ± 6 percent; ± 10 percent. However, these are unreliable owing to the time lapse before these responding values are reached. Besides, thermal elements do not for example not respond if the fan stops upon a supply failure. Furthermore, especially with small fans and fan motors, the power input at nominal performance while running, and at short circuit (with stopped rotor), does not show sufficient difference in most instances to be used for reliable protective measures.

There are also known for safeguarding electronic devices air current pressure switches or so-called "wind switches" which respond when the air current pressure in a ventilated electronic chamber ceases. However, as the air current conditions can be very different in a device due to differences in mounting, to different makes of fans, and also to different positioning of the current pressure switching elements in the housing — and because it is wished to switch off the cooled device as soon as possible when a fan has ceased — difficulties result in practice.

An object of the present invention is to find a device which can cause immediate, reliable and simple safety precautions when a fan has ceased, at the same time avoiding the disadvantages described above.

In accordance with the invention, there is provided a protection device, particularly for small fans, characterized in that a voltage created by a tacho-generator known per se is used to protect the motor or other devices to be cooled, whose number of rotations is dependent on the number of rotations of the fan.

In such a protection device it is advantageous if the fan includes a central shaft which rotates in a stationary bearing, and the tacho-generator comprises a polarized magnetic ring mounted on the shaft and a winding encircling the shaft.

It is furthermore advantageous according to the invention if the fan arrangement includes switching means responsive to the output voltage of the tachometer generator for disconnecting a load coded by said fan arrangement when said voltage falls below a predetermined value. In some cases it is advantageous if said winding is provided in the stator of a motor driving the fan.

In a preferred embodiment of the invention, the fan has blades of ferromagnetic material and includes a housing surrounding the fan blades, and a magnetic field sensitive induction element is provided in the fan housing to form with the fan blades a tacho-generator.

Naturally, it will be appreciated that many variations may be effected without departing from the spirit and scope of the present inventive concept.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing in which corresponding parts have been given the same reference numerals.

BRIEF DESCRIPTION OF THE DRAWING

FIGS. 6 and 7 illustrate diagrammatically modifications of the apparatus of FIG. 5;

FIG. 8 illustrates, partly diagrammatically and partly in section, a final form of combined motor and tacho-generator;

FIG. 9 is a side view corresponding to FIG. 8, partly sectioned as indicated in FIG. 8;

FIG. 10 illustrates a system embodying the invention in which any of the apparatus shown in the above figures may be used; and FIG. 10a illustrates an alternative component for use in the system of FIG. 10.

DESCRIPTION OF THE PREFERRED EMBODIMENTS

Figure 1:
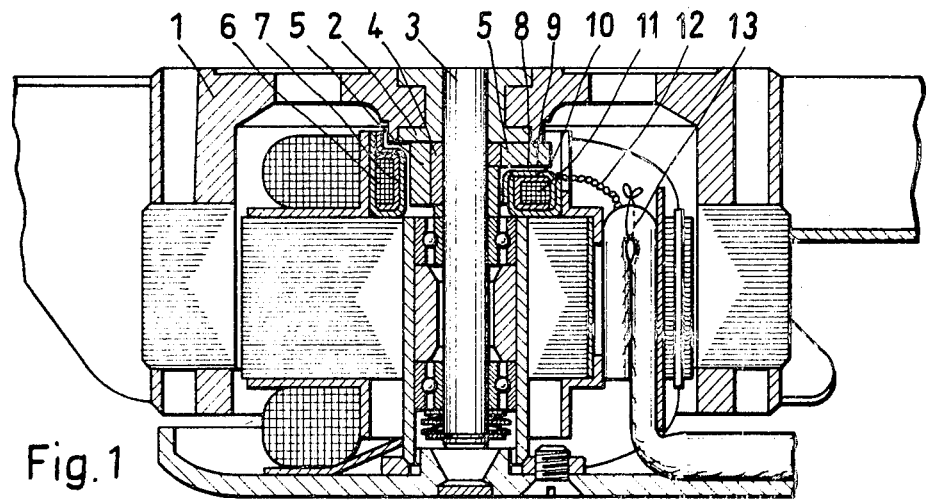
FIG. 1 comprises sectional elevations of two types of combined motor and tacho-generator used in the invention, the right-hand part of the figure showing one embodiment and the left-hand the other.
Figure 2:
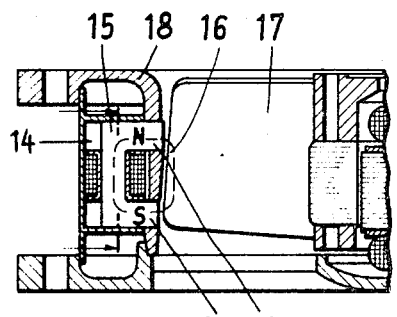
FIG. 2 is a section along a radius of a combined fan and tacho-generator.
Figure 3:
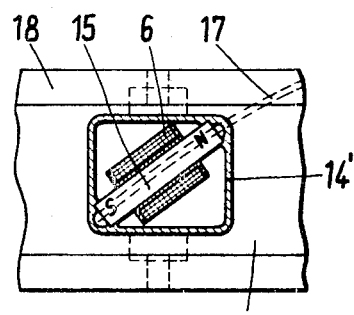
FIG. 3 is a side view of the apparatus of FIG. 2, partly sectioned as indicated on FIG. 2.

The tacho-generators of FIGS. 1, 5 to 7, 8 and 9 are of the claw pole type, whereas those of FIGS. 2 and 3 have individual ring magnets.

FIG. 1 illustrates in section an axial fan with an external cage rotor 1, a rotor hub or shaft bush 2, a shaft 3 carrying, in the left-hand embodiment, via a non-magnetic intermediate member 4 made for example of brass, a permanent magnet ring 5 intermittently polarized around its circumference so as to form an arrangement of poles, said ring inducing a voltage proportional to the speed of rotation in a claw pole arrangement 7 having an output winding 6. This arrangement is intended primarily for a motor having a three-phase current winding with the winding distributed over the whole circumference without interruption.

The right-hand half of the cross-section shown in FIG. 1 illustrates a tacho-generator with an axial air gap, in which the ring 5 is magnetized at its side 9, facing an inductive air gap 8, with intermittent poles and serving to induce a voltage in the winding 11 of a claw pole arrangement 10 proportional to the speed of rotation. In this embodiment, the generator lead 12 is led out through a gap in the motor winding together with the motor winding lead 13; in this case the motor winding could be, for example, a split pole winding with distinct poles.

Similar arrangements can be used with internal rotor motors.

FIG. 2 and 3 show part of a fan whose impeller means, here in the form of blades 17, are of ferromagnetic material. An induction element 14 is mounted in the housing 18 of the fan. The induction element 14 comprises a permanent magnet 15 having poles 19, 20 joined by a section which is surrounded by the output coil 6. The passage of each fan blade 17 lowers the reluctance of the magnetic circuit of the magnet 15 and a sequence of unidirectional voltage pulses is thus induced in the coil 6; the average output voltage is thus dependent on the speed of rotation of the fan. The element 14 is arranged so that the poles 19, 20 lie in a line parallel to the edge of the fan blade 17 as it passes to give the maximum inductive change. It is necessary only to have two openings in the housing 18, for the insertion of the poles 19, 20.

As best seen in FIG. 3, the induction element 14 may be encased in a synthetic material for assembly onto the fan as a unit, for instance in a casing 14'.

In special cases one can arrange for two induction units facing each other, or several induction units symmetrically distributed, especially for reasons of equalizing the eccentricity of the fan wheel, by suitable circuitry.

Figure 4:
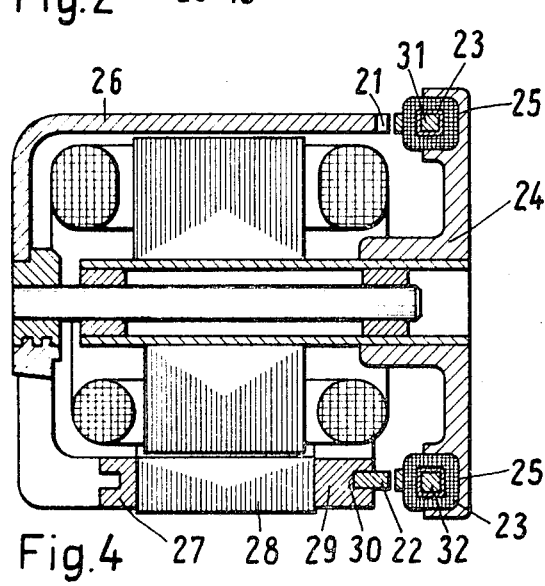
FIG. 4 is a sectional elevation of a further combined motor and tacho-generator.

FIG. 4 illustrates an external rotor motor in which, for reasons of weight distribution, ferromagnetic parts 21 or permanent magnetic parts 22 are arranged on the open end of the rotor housing bell, and are distributed evenly over the circumference, protruding in an axial direction. The moving said parts induce a voltage in induction coils 23 in the axially opposite portion 25 of a flange 24, these portions carrying permanent magnetic cores 31 or soft iron magnetic cores 32. The upper half of the cross-section illustrates an embodiment with an eddy current rotor housing 26; the lower half illustrates the same with a cage housing 27 having a packet of iron laminae 28. The tacho-generating parts 22 are attached, for instance by being pressed into a cast-in groove 30 in an end ring 29.

Figure 5:
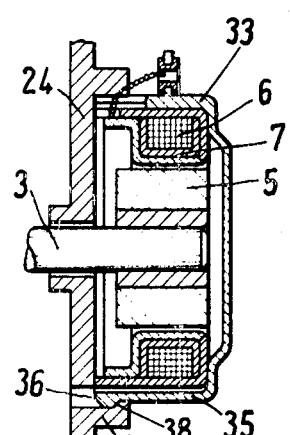
FIG. 5 illustrates in section a tacho-generator attached to the flange of a fan driving motor.

FIG. 5 illustrates as one embodiment an attachment unit comprising an external tacho-generator 33 mounted on the side of a flange 24, where the shaft 3 protrudes. The tacho-generator attachment 33 with winding 6 and claw poles 7 is held in a simple manner by fitting into the housing, by means of radially resilient enlarged portions 35 individually protruding in an axial direction, with noses 36 which penetrate into corresponding depressions 38 provided in a rim 37 on the flange 24. The magnetic pole wheel 5 is adjusted by means of a gauge into the right axial position towards the inducting system and then secured, for example by gluing, which also overcomes even very unfavorable adding of axial tolerances in the stator in a simple manner.

It will be apparent that such a tacho-generator can be added to an existing motor.

In FIG. 6, as a variation of FIG. 5, the rim 37 has been pulled inside towards the side of the motor, in order to avoid protruding of any parts of the exterior surface of the flange.

FIG. 7 illustrates a variation of the mounting of FIG. 5, having an elevated edge 40 forming one piece with the flange 24, into which again the same exterior tacho-generator 5 to 7 has been inserted, which is closed by a simple flat cover 41. The depth of this edge 24 depends on the axial length of the tacho-generator to be inserted.

FIG. 8 and 9 illustrate a portions of an outer rotor 28, 29 with a multi-pole magnetized ring 45 in cooperation with a stationary claw pole unit 46, 47 enclosed by said ring (compare 6, 7 in FIG. 1). In this embodiment, an annular ferromagnetic member 48 is arranged to protrude over the open rotor housing edge, to allow the magnetic ring 45 to be inserted into the protruding portion of the ring 48 which serves at the same time as a magnetic return circuit member of the claw pole unit 47, that is, of claw portions 47a and 47b. The claw portions 47a, 47b are most clearly seen in FIG. 9. From FIG. 9 it will be clearly seen that claw pole unit 47 comprises a first group of claw portions 47a and a second group of claw portions 47b axially spaced from the first group and defining therewith a circumferential recess accommodating pick-up winding means 46. The generator winding 46 is situated in the claw pole ring which, in this embodiment, is fixed to the flange 24.

The claw pole body 47 with the claws 47a, 47b encircles the electrical wire circular winding 46 inserted therein, and the multipole magnet ring 45 works in conjunction therewith via the air gap 49. In the practical embodiment this magnet ring 45 is a flexible permanent magnet strip, lying against a wedge 50 adjoining the ring 48; this is known, for example, by its trade name "Sprox." This flexible permanent magnet has been magnetized beforehand with a high current load (current impact of $10^4$ to $10^5$ Amp.) over an inflexible meander-shaped conductor, whose conductor distances correspond to the distribution of claws of the claw poles.

FIG. 10 illustrates the working of monitoring means according to the invention. With any drop in the number of rotations of the motor (M) 52 the tacho-generator (G) 54 mechanically connected thereto (as indicated by numeral 53) gives off a reduced induced voltage over a two-phase lead 55, to an amplifier 56, whose output 57 is connected to a low tension switch 58, or the equivalent, which interrupts the two-or three-phase supply 59 to the motor when the value of the voltage is less than a reference value. This interruption of the motor lead 59, however, must not take place when starting the motor by means of switch 60, when the generator, being still in its static state, cannot yet supply any voltage. For this reason, a time-delay relay 61a, which works together with the motor switch 60, only opens the bridging member 62 when the motor switch 60 has remained closed for a certain time. 61b in FIG. 10a indicates a thermal variant of starter relay 61a.

While tacho-generators are known for other control purposes, the invention achieves a simple, space-saving control protection requiring no extra mounting, which overcomes the disadvantages described in the introduction of known protection devices for electronic fans and ventilation devices.

Many possible modifications will become apparent from the foregoing without departing from the spirit of the present invention. However, the foregoing disclosure is presented in an illustrative sense rather than a

What is claimed as new and desired to be protected by Letters Patent is set forth in the appended claims.

We claim:

1. A fan arrangement having automatic control capability comprising rotatable impeller means; motor means for rotating said impeller means and including external rotor means; and signal-generating means for generating an electrical signal which is a function of and indicative of the rotational speed of said impeller means, said signal-generating means comprising a stationary claw pole unit including pick-up winding means, and a multi-pole permanently magnetized ring comprising a flexible permanently magnet strip radially outwardly of said claw-pole unit and being mounted on and rotatable with said rotor means relative to said claw pole unit.

2. A fan arrangement as defined in claim 1, said external rotor means comprising an annular ferromagnetic member radially outwardly of and surrounding said magnetized ring.

3. A fan arrangement as defined in claim 2, said claw pole unit comprising a plurality of radially outwardly projecting claw portions.

4. A fan arrangement as defined in claim 2, said claw pole unit comprising first and second groups of axially spaced peripherally offset radially outwardly projecting claw portions together defining a circumferential recess, and said pick-up winding means comprising electrical wire means coiled around said claw pole unit and accommodated in said circumferential recess.

* * * * *